US012584271B2

(12) United States Patent
Fang et al.

(10) Patent No.: US 12,584,271 B2
(45) Date of Patent: Mar. 24, 2026

(54) REACTIVE DIGITAL PRINTING METHODS AND SYSTEMS, PRINTED FABRIC OBTAINED THEREBY AND RELATED CLOTHING ITEMS

(71) Applicant: GUANGZHOU JINGYILVFANG TECHNOLOGY CO., LTD, Guangzhou City (CN)

(72) Inventors: Wenjie Fang, Guangzhou City (CN); Xinlou Qu, Guangzhou City (CN); Bei Li, Guangzhou City (CN); Yong Deng, Guangzhou City (CN); Zhipeng Zhong, Guangzhou City (CN)

(73) Assignee: GUANGZHOU JINGYILVFANG TECHNOLOGY CO., LTD, Guangzhou City (CN)

( * ) Notice: Subject to any disclaimer, the term of this patent is extended or adjusted under 35 U.S.C. 154(b) by 24 days.

(21) Appl. No.: 18/332,592

(22) Filed: Jun. 9, 2023

(65) Prior Publication Data

US 2023/0399795 A1 Dec. 14, 2023

(30) Foreign Application Priority Data

Jun. 10, 2022 (CN) .......................... 202210652093.0

(51) Int. Cl.
*C09D 11/328* (2014.01)
*B41J 3/407* (2006.01)
(Continued)

(52) U.S. Cl.
CPC ............. *D06P 5/002* (2013.01); *B41J 3/4078* (2013.01); *C09D 11/037* (2013.01); *C09D 11/14* (2013.01);
(Continued)

(58) Field of Classification Search
CPC .. D06P 5/002; D06P 1/384; D06P 1/48; D06P 1/628; D06P 1/6735; D06P 3/666;
(Continued)

(56) References Cited

U.S. PATENT DOCUMENTS

| 3,416,878 A | * | 12/1968 | Bieber | ...................... | D06P 3/66 |
| | | | | | 8/549 |
| 5,250,121 A | | 10/1993 | Yamamoto et al. | | |

(Continued)

FOREIGN PATENT DOCUMENTS

| CN | 1584196 A | 2/2005 |
| CN | 101608406 A | 12/2009 |

(Continued)

OTHER PUBLICATIONS

Liu, J. et al., "Dyeing of soybean protein/flax blended yarns with reactive dyes and subsequent dye-fixation." Scientific Reports, 12:1506 (2022), 12 pages.

(Continued)

*Primary Examiner* — Yaovi M Ameh
(74) *Attorney, Agent, or Firm* — Steinfl + Bruno LLP

(57) ABSTRACT

A reactive digital printing method can be performed with the following steps: 1) applying a primer to a fabric to be printed; (2) applying an ink containing a dye with multi-reactive groups to the fabric to be printed in step (1); (3) steaming and coloring, washing, dehydrating and shaping the fabric in step (2), to obtain a printed product. A related system with a combination of primer, a dye with multi-reactive group, printed fabric produced with the reactive digital printing method and items comprising the printed fabric can also be provided.

12 Claims, 4 Drawing Sheets

(51) Int. Cl.

| | |
|---|---|
| *C09D 11/037* | (2014.01) |
| *C09D 11/14* | (2006.01) |
| *C09D 11/38* | (2014.01) |
| *C09D 11/54* | (2014.01) |
| *D06P 1/38* | (2006.01) |
| *D06P 1/384* | (2006.01) |
| *D06P 1/44* | (2006.01) |
| *D06P 1/46* | (2006.01) |
| *D06P 1/48* | (2006.01) |
| *D06P 1/62* | (2006.01) |
| *D06P 1/673* | (2006.01) |
| *D06P 3/66* | (2006.01) |
| *D06P 5/00* | (2006.01) |
| *D06P 5/02* | (2006.01) |
| *D06P 5/20* | (2006.01) |
| *D06P 5/30* | (2006.01) |
| *D06L 1/16* | (2006.01) |

(52) U.S. Cl.
CPC ............ *C09D 11/328* (2013.01); *C09D 11/38* (2013.01); *C09D 11/54* (2013.01); *D06P 1/38* (2013.01); *D06P 1/384* (2013.01); *D06P 1/445* (2013.01); *D06P 1/46* (2013.01); *D06P 1/48* (2013.01); *D06P 1/628* (2013.01); *D06P 1/6735* (2013.01); *D06P 3/66* (2013.01); *D06P 3/666* (2013.01); *D06P 5/02* (2013.01); *D06P 5/2077* (2013.01); *D06P 5/30* (2013.01); *D06L 1/16* (2013.01)

(58) Field of Classification Search
CPC .. D06P 5/2077; D06P 5/30; D06P 1/38; D06P 3/66; D06P 1/445; D06P 1/46; D06P 5/02; B41J 3/4078; C09D 11/037; C09D 11/14; C09D 11/328; C09D 11/38; C09D 11/54; D06L 1/16
See application file for complete search history.

(56) References Cited

U.S. PATENT DOCUMENTS

| | | | |
|---|---|---|---|
| 5,542,972 A | 8/1996 | Von Der Eltz et al. | |
| 6,432,186 B1 | 8/2002 | Taniguchi | |
| 2003/0015120 A1 | 1/2003 | Adamic et al. | |
| 2016/0326384 A1* | 11/2016 | Chen ........................ | C09D 5/14 |
| 2017/0226361 A1 | 8/2017 | Lu et al. | |
| 2018/0371280 A1 | 12/2018 | Garzon et al. | |
| 2022/0033666 A1* | 2/2022 | Okada ................. | D06P 1/65118 |
| 2023/0159780 A1 | 5/2023 | Qu et al. | |

FOREIGN PATENT DOCUMENTS

| | | | | |
|---|---|---|---|---|
| CN | 103469618 A | * | 12/2013 | ................ D06P 1/38 |
| CN | 104098954 A | | 10/2014 | |
| CN | 104562802 A | | 4/2015 | |
| CN | 106930118 A | | 7/2017 | |
| CN | 108070300 A | | 5/2018 | |
| CN | 109235088 A | | 1/2019 | |
| CN | 109505158 A | | 3/2019 | |
| CN | 110437675 A | | 11/2019 | |
| CN | 110719977 A | | 1/2020 | |
| CN | 112593426 A | | 4/2021 | |
| CN | 113668266 A | | 11/2021 | |
| WO | WO-2014202223 A2 | * | 12/2014 | .......... B05B 3/1014 |

OTHER PUBLICATIONS

Nadabo, N. A., "Synthesis and Characterization of Some Mono Chloro-S-Triazine Vinyl Sulphone Reactive Dyes," ChemSearch Journal 5(1): 21-26, 2014.
Wikipedia. "Acidity Regulator". 2022 [Cited Nov. 21, 2022]. Available from https://en.wikipedia.org/wiki/Acidity_regulator. Downloaded from The Wayback Machine for Nov. 20, 2022.
Wikipedia. "Antimicrobial". 2022 [Cited Nov. 21, 2022]. Available from https://en.wikipedia.org/wiki/Antimicrobial. Downloaded from The Wayback Machine for Nov. 22, 2022.
Wikipedia. "Chelation". 2022 [Cited Nov. 21, 2022]. Available from https://en.wikipedia.org/wiki/Chelation. Downloaded from The Wayback Machine for Nov. 21, 2022.
Wikipedia. "Defoamer". 2022 [Cited Nov. 21, 2022]. Available from en.wikipedia.org/wiki/Defoamer. Downloaded from The Wayback Machine for Nov. 19, 2022.
Wikipedia. "Dye". 2022 [Cited Nov. 21, 2022]. Available from https://en.wikipedia.org/wiki/Dye. Downloaded from The Wayback Machine for Dec. 1, 2022.
Wikipedia. "Dyeing". 2022 [Cited Nov. 21, 2022]. Available from https://en.wikipedia.org/wiki/Dyeing. Downloaded from The Wayback Machine for Oct. 1, 2022.
Wikipedia. "Ink". 2022 [Cited Nov. 21, 2022]. Available from https://en.wikipedia.org/wiki/Ink. Downloaded from The Wayback Machine for Nov. 29, 2022.
Wikipedia. "Solvent". 2022 [Cited Nov. 21, 2022]. Available from https://en.wikipedia.org/wiki/Solvent. Downloaded from The Wayback Machine for Nov. 20, 2022.
Wikipedia. "Pigment". 2022 [Cited Nov. 21, 2022]. Available from https://en.wikipedia.org/wiki/Pigment. Downloaded from The Wayback Machine for Dec. 5, 2022.
Wikipedia. "Polyol". 2022 [Cited Nov. 21, 2022]. Available from https://en.wikipedia.org/wiki/Polyol. Downloaded from The Wayback Machine for Jan. 14, 2023.
Wikipedia. "Reactive Dye". 2022 [Cited Nov. 21, 2022]. Available from https://en.wikipedia.org/wiki/Reactive_dye. Downloaded from The Wayback Machine for Sep. 7, 2022.
Wikipedia. "Textile". 2022 [Cited Nov. 21, 2022]. Available from https://en.wikipedia.org/wiki/Textile. Downloaded from The Wayback Machine for Nov. 23, 2022.
Wikipedia. "Textile Printing". 2022 [Cited Nov. 21, 2022]. Available from https://en.wikipedia.org/wiki/Textile_printing. Downloaded from The Wayback Machine for Nov. 6, 2022.
Wikipedia. "Wetting". 2022 [Cited Nov. 21, 2022]. Available from https://en.wikipedia.org/wiki/Wetting. Downloaded from The Wayback Machine for Nov. 9, 2022.
Non-Final Office Action issued for U.S. Appl. No. 18/057,521, filed Nov. 21, 2022, on behalf of Guangzhou Xunjie Digital Technology Co., Ltd et al. Mail Date: Aug. 7, 2025. 13 pages.
Search Report issued for CN Application No. 2022106520930 Filed on Jun. 10, 2022 on behalf of Guangzhou Xunjie Digital Technology Co., Ltd., et al. Mail Date: Feb. 27, 2023. Chinese with English Translation. 5 pages.

* cited by examiner

REACTIVE DIGITAL PRINTING METHODS AND SYSTEMS, PRINTED FABRIC OBTAINED THEREBY AND RELATED CLOTHING ITEMS

CROSS-REFERENCE TO RELATED APPLICATIONS

The present application claims priority to Chinese Patent Application No. CN 2022106520930 filed on Jun. 10, 2022, the contents of which are incorporated herein by reference in its entirety.

TECHNICAL FIELD

The present disclosure relates to the technical field of digital printing, and in particular, to a reactive digital printing methods and systems preferably using a low-alkali primer, printed fabric obtained thereby and related clothing items.

BACKGROUND

Reactive dyes are the main dyes for dyeing and printing cellulose fiber and regenerated cellulose fiber products, which have the advantages of good fastness, complete color spectrum, bright color and good hand feeling.

Despite attempts to improve the existing process challenges remain in optimizing high storage stability of the ink, color fixation rate, color fastness and brilliance, timing of the process related water and energy consumption as well ensuring quality of the work product.

SUMMARY

The present disclosure provides a reactive digital printing method and system using a primer, together with a multireactive groups dye to provide a printed fabric which can be used in the manufacturing of various items which comprise printed fabric (herein fabric items) and in particular clothing items.

According to a first aspect, a reactive digital printing method and systems are described, which comprises contacting the fabric with a primer before printing the fabric by digital printing. In particular the reactive digital printing method uses dyes with reactive groups as colorants in digital printing, prints the fabric with the primer, and completes the entire digital printing process after drying, steaming and coloring, simple washing, dehydrating, and shaping. Preferably the primer is a low alkali primer. The system for reactive digital printing comprises a combination of a primer with at least one of a reactive dye, a fabric, means for steaming, means for coloring, means for washing, means for dehydrating and/or means for shaping the fabric. The components of the system are comprised in various combinations for simultaneous combined and/or sequential use in any one of the method herein described as would be understood by a skilled person.

According to a second aspect a printed fabric is described prepared by the reactive digital printing method and/or system according to any one of the embodiments herein described.

According to a third aspect, a fabric item is described comprising a printed fabric of obtained with the method and/or system of the disclosure. In particular, a fabric item can be a clothing item as will be understood by a skilled person.

The reactive digital printing preparation process of the present disclosure and related system are clean and environmentally friendly, and produces printed fabric which has the characteristics of good fastness, high color fixation rate, good hand feeling and bright color, as will be understood by a skilled person upon review of the instant disclosure.

The reactive digital printing methods and herein described and related systems, printed fabric and fabric items herein described can be used in connection with applications wherein coloration of textile material is desired without limiting to a particular industry. An ordinary skilled person in the art.

The details of one or more embodiments of the disclosure are set forth in the accompanying drawings and the description below. Other features, objects, and advantages will be apparent from the description and drawings, and from the claims.

BRIEF DESCRIPTION OF DRAWINGS

The accompanying drawings, which are incorporated into and constitute a part of this specification, illustrate one or more embodiments of the present disclosure and, together with the detailed description and the examples, serve to explain the principles and implementations of the disclosure.

DETAILED DESCRIPTION

Figure 1:
FIG. 1 shows a physical diagram of a printed product in Example 4.

Provided herein are a reactive digital printing method and systems which in several embodiments can be used to optimize timing of the process as well as related water and energy consumption while ensuring high quality of the work product.

In particular, the reactive digital printing method and systems herein described can provide a fast-printing process, with reduced water and energy consumption while ensuring a good color fixation rate, color fastness and brilliance, which in some embodiments can be superior to existing methods as will be understood by a skilled person upon reading of the present disclosure.

The term "digital printing" as used herein indicates a printing process that involves transferring images, text, and designs directly onto a printing device using digital technology and computer control. In comparison to traditional printing methods, digital printing offers several features and can take on various forms to cater to different printing needs.

Key features of digital printing include High resolution: Digital printing enables extremely high image resolution, resulting in clear and detailed print quality. This makes it an ideal choice for producing intricate images and complex designs.

Key features of digital printing also include customization: Digital printing allows easy customization as it can directly print different patterns and content from digital files. This means that different designs can be printed within the same printing job, such as personalized patterns on garments.

Key features of digital printing further include Fast production: Digital printing offers a quick production turnaround as it eliminates the need for plate preparation. With digital files prepared, printing can commence immediately. This makes digital printing highly suitable for fast delivery and short-run production requirements.

The process of digital printing can take various forms to accommodate different types of printing as will be understood by a skilled person. For example, type digital printing can be used in connection with 1. Small-scale printing: This form is suitable for printing on garments, hats, and other small items. Small-scale digital printing machines typically have a smaller printing area but can achieve high resolution and produce fine image output; and
2. Large-format printing: This form is used for creating large-scale images, flags, banners, and other large fabrics. Large-format digital printing machines typically have a larger printing area and higher printing speed to meet the demands of large-scale printing jobs.

Whether it's small-scale printing or large-format printing, digital printing technology offers high-quality, customizable, and fast printing solutions, making it widely utilized in the modern printing industry for printing with inks or dye.

The term "ink" as used herein indicates a gel, sol, or solution that contains at least one colorant, such as a dye or pigment, and is used to color a surface to produce an image, text, or design. Ink formulas vary, but commonly involve two components: Colorants and Vehicles. Suitable colorants comprise pigments and dye. The vehicles usually comprise binders. Inks in the sense of the disclosure can be in an aqueous liquid paste and/or powder form depending on the colorant and vehicle used as will be understood by an ordinary skilled person in the art. [1]

The term "inkjet ink" as used herein indicates an ink in a formulation enabling application through nozzles on a substrate of interest. Inkjet ink comprises liquid ink that can be applied in the form of resultant ink droplets to form a pattern on the substrate. Inkjet ink may also comprise solid ink formulations usually waxy ink with a consistency similar to a crayon, as will be understood by an ordinary skilled person in the art. Inkjet ink can be in either dye-based or pigmented forms as will be understood by an ordinary skilled person in the art.

The term "pigment" as used herein indicates a colored material that is completely or nearly insoluble in water. In contrast, dyes are typically soluble, at least at some stage in their use. Generally, dyes are often organic compounds whereas pigments are often inorganic compounds. Exemplary pigments comprise ochre, charcoal, and lapis lazuli as will be understood by a person with ordinary skill in the art. [2]

The term "dye" as used herein indicates a colored substance that chemically bonds to the substrate to which it is being applied. This property distinguishes dyes from pigments which do not chemically bind to the material they color. A dye in the sense of the disclosure is generally applied in an aqueous solution, and may require a mordant to improve the fastness of the dye on the fiber. Dyes are usually soluble in water whereas pigments are insoluble. Some dyes can be rendered insoluble with the addition of salt to produce a fake pigment as will be understood by a person with ordinary skills. [3]

Dyes in the sense of the disclosure can be classified, according to their solubility and chemical properties, as acid dyes, basic dyes, mordant dyes, vat dyes, and reactive dye. [3]

In particular, in a reactive dye, a chromophore (an atom or group whose presence is responsible for the color of a compound) contains a substituent that reacts with the substrate. In reactive dyes, the covalent bonds that attach reactive dye to natural fibers make them among the most permanent of dyes. Reactive dyes have good fastness properties owing to the covalent bonding that occurs during dyeing and can be used for coloring various types of fabric such as cellulose fibers. wool and nylon; in the latter case they are applied under weakly acidic conditions. [4]

Reactive dyes can react with a substrate at various temperatures as will be understood by a person with ordinary skills in the art. "Cold" reactive dyes, which can be applied at room temperature comprise Procion MX, Cibacron F, and Drimarene K. as will be understood by a skilled person. [4]

The reactive digital printing method and system using a primer, together with a multi-reactive groups dye to provide a printed fabric can improve the quality of the printed fabric. In particular, direct digital printing on fabrics, after primer treatment, can prevent ink penetration on the fabric surface, resulting in clearer patterns and promoting the reaction between dyes and fibers, showcasing better printing effects.

In methods and system of the disclosure, prior to introducing textile semi-finished products into the machine, the fabric surface undergoes priming to enhance its hydrophilicity, ink absorption, and viscosity.

In particular, the steps of a reactive digital printing method can include printing the reactive dye ink directly on the fabric after the primer treatment by means of digital printing, or printing it on the transfer substrate and then transferring it to the fabric to be printed, and then obtaining a printed fabric. After drying, the printed fabric is subject to steaming and coloring, washing, and shaping, so as to obtain a printed product, as will be understood by a skilled person.

In the reactive digital printing method of the disclosure a primer is used in combination with a multi-reactive groups dye to provide a printed fabric.

The term "primer" as used herein indicates a compound or composition that is used to prepare a surface for printing or coating. Primers have various features and characteristics, both functionally and structurally, that contribute to their effectiveness in the printing process. In particular, functionally, a primer serves several purposes, including:

1. Ink adhesion: Primers enhance the adhesion of ink to the fabric, ensuring that the ink remains firmly attached to the surface. This feature allows for sharper and more durable prints
2. Reduced ink consumption: Primers can help reduce the amount of ink needed for printing while still achieving vibrant and full-color results. They accomplish this by optimizing the interaction between the ink and the fabric, allowing for efficient ink usage.
3. Extended print longevity: Primers improve the durability of prints, making them more resistant to fading, rubbing, washing, and other environmental factors. This extends the lifespan of the printed design.

Structurally, primers contain active agents that provide the aforementioned functions in a general manner. These active agents can include various chemical compounds such as polymers, resins, additives, and solvents. The specific composition and structure of the primer can vary depending on the desired application, the type of material being printed, the type of dye and the desired effect as will be understood by a skilled person.

In some embodiments, the primer composition mainly consists of starch or gum, urea, ammonium sulfate, and water mixed in certain proportions as will be understood by a skilled person. The specific composition can be identified in view of the desired functionality and the type of printing and effect desired. For example, urea is a commonly used humectant, and as its proportion increases, it enhances the fabric's coloration effect but simultaneously reduces the printing precision, and this will be understood by a skilled person.

In preferred embodiments of methods and systems herein described the primer is a composition that is configured to reduce the excessive use of alkali agent and pollution caused by the use of urea during printing processing, by using a "low alkali primer".

The term "low alkali primer" as used herein refers to a type of primer with a low alkalinity level. This primer comprises compositions specifically formulated to have a reduced alkaline content, which can be beneficial for certain applications. For example, by using a low alkali primer, it is possible to achieve improved printing results, such as enhanced color vibrancy, better ink adhesion, and increased durability on the fabric. In general, in methods and systems, herein described a low alkali primer is preferred due to its compatibility with the reactive digital printing method and its ability to optimize the performance of the printing process.

A low alkali primer composition in the sense of the present disclosure can comprise:

an alkaline compound that can help regulate pH levels and promote dye fixation, such as sodium or potassium bicarbonate and additional alkaline compounds identifiable by a skilled person;

an acidic compound that aids in the activation of the reactive dye, such as a 2. 3-nitrobenzenesulfonic acid sodium salt: and toluene sulfonic acid and additional acidic compounds identifiable by a skilled person; and a polymer that acts as a thickening and binding agent; and improves the viscosity of the primer and enhances its adhesion to the fabric, such as sodium alginate carboxymethyl cellulose, polyvinyl alcohol (PVA), polyacrylic acid (PAA) and additional polymers identifiable by a skilled person.

In particular, the function of the polymer in the primer is primarily to improve the viscosity and adhesion of the primer to the fabric. It helps create a uniform and stable coating on the fabric surface, allowing for better ink absorption and preventing ink bleeding or spreading. Additionally, the polymer can assist in enhancing the durability and wash resistance of the printed design.

A low alkali primer can also be characterized by a pKa range, which can be used in view of specific requirements depending on the desired reaction and compatibility with other components.

Accordingly, in order to understand the specific composition and features of the primer formulation in the sense of the disclosure (type and concentration of the alkaline compound, acidic compound and polymer, as well as related pKa), it is important to consider the specific conditions and goals of the printing process.

In some embodiments, a primer in the sense of the present disclosure can comprise an alkaline compound such as sodium bicarbonate or potassium bicarbonate, in a mass percentage from 0.1% to 2%, an acidic compound such as sodium 3-nitrobenzenesulfonate, or toluene sulfonic acid in a mass percentage range from 0.5%~2%, and a polymer such as sodium alginate carboxymethyl cellulose, polyvinyl alcohol (PVA), polyacrylic acid (PAA) in a mass percentage range of 0.5%~5%, and the rest is water.

In some embodiments, a primer in the sense of the disclosure can comprise an alkaline compound such as sodium bicarbonate or potassium bicarbonate, in a mass percentage ranging from 0.1% to 10%, an acidic compound such as sodium 3-nitrobenzenesulfonate, or toluene sulfonic acid in a mass percentage ranging from 0.1% to 10%, and a polymer such as sodium alginate carboxymethyl cellulose, polyvinyl alcohol (PVA), polyacrylic acid (PAA) in a mass percentage of sodium alginate ranges from 0.1% to 15%, and the rest is water.

In embodiments of the disclosure a method is described which comprises applying a primer to a fabric to be printed, the applying before contacting the fabric with a dye with reactive groups.

In particular in some embodiments, reactive digital printing method is described, which comprises the following steps:

(1) applying a primer to a fabric to be printed;

(2) applying an ink containing a dye with multi-reactive groups to the fabric to be printed produced by step (1); and (3) steaming and coloring, washing, dehydrating and shaping the fabric produced by step (2), so as to obtain a printed product.

In some embodiments, the reactive digital printing method of the disclosure, step 1 produces a first treated fabric comprising one or more primers applied to the fabric. In step 2, an ink containing a dye with multi-reactive groups is applied to the first treated fabric to produce a second treated fabric further comprising one or more dye with multi-reactive groups applied to the first treated fabric. The second treated fabric is then subjected to the steaming and coloring, washing, dehydrating and shaping, usually in a sequential order to obtain a printed fabric.

In some embodiments, the dye with multi-reactive groups comprises three or more reactive groups.

In some embodiments, the dye with multi-reactive groups comprises three or more reactive groups which are identifiable by a skilled person.

In some preferred embodiments, the applying a primer is performed by coating or pad-batching. The primer is applied on the fabric to be printed, and the fabric is processed to ensure the coloring effect.

In some preferred embodiments of the reactive digital printing method of the disclosure and related systems, printed fabric and fabric items, the fabric to be printed after the primer is applied in the step (1) can be dried. In some more preferred embodiments of the disclosure, a temperature of the drying is 60-120° C.

In some preferred embodiments of the present disclosure, the drying temperature is 60-120° C., and the range can be extended to range from 40 to 150° C.

In some more preferred embodiments of the reactive digital printing method of the disclosure and related systems, printed fabric and fabric items, a duration of the drying is 1~3 mins.

In some preferred embodiments of the present disclosure, the drying time is 1-10 minutes.

In some embodiments of the reactive digital printing method of the disclosure and related systems, printed fabric and fabric items, in step (2) of the method, the applying an ink containing a dye with multi-reactive groups to the fabric to be printed produced in outcome of step (1) comprises: printing the nozzle directly onto the pretreated cloth surface, or applying it to the cloth surface through the nozzle, or printing onto the transfer material through the nozzle, and then transferring it to the cloth surface to obtain the printed pattern.

In some preferred embodiments of the reactive digital printing method of the disclosure and related systems, printed fabric and fabric items, in step (2) of the method, the applying an ink containing a dye with multi-reactive groups to the fabric to be printed produced in outcome of step (1) comprises: jet-printing the ink containing the dye with multi-reactive groups on the primed fabric, or jet-printing the ink containing the dye with multi-reactive groups on a transfer printing film (or a printing paper), and then transfer printing it on the primed fabric.

In some more preferred embodiments of the reactive digital printing method of the disclosure and related systems, printed fabric and fabric items, in step 2 of the method, the applying comprises transfer printing implemented by using a cold transfer printing device; after the primer is applied to the fabric to be printed to provide the first treated fabric. In those embodiments, the first treated fabric is laminated with a transfer printing film (or a printing paper), and then the transfer printing process is completed by cold pressing the transfer printing film (or printing paper) on the first treated fabric to produce the second treated fabric in outcome of step 2.

In some preferred embodiments of the reactive digital printing method of the disclosure and related systems printed fabric and fabric items, the dye with multi-reactive groups is selected from the group consisting of a divinylsulfone reactive group-monochloro-s-triazine reactive dye, a bis-monochloro-s-triazine reactive group-vinylsulfone reactive dye, a monofluoro-s-triazine reactive group-divinylsulfone reactive dye, a bis-monofluoro-s-triazine reactive group-vinylsulfone reactive dye, a divinylsulfone bis-monochloro-s-triazine reactive dye, and a reactive dye with three or more reactive groups.

In some preferred embodiments of the disclosure, the ink also includes a reactive ink prefabricated liquid, in which the ink components used here are pre-made solutions.

In some embodiments, the method can further comprise the ink, by providing a dye first, and then dissolve the dye in combination with colorants and vehicles and/or additional components, to obtain the printing ink.

In some embodiments of the reactive digital printing method of the disclosure and related systems printed fabric and fabric items, in which a reactive ink prefabricated liquid is used, the reactive ink prefabricated liquid contains a polyhydric alcohol, a solubilizer, a wetting agent, a chelating agent, a pH adjuster, an antifoaming agent, an antibacterial agent, and a leveling agent.

The term "Polyhydric alcohols" in the sense of the disclosure, indicates organic compounds with multiple hydroxyl groups in their molecules, which aim to enhance the ink's moisturizing performance. The term "solubilizers" as used herein, indicates chemical substances that increase the solubility of dyes spreading chemicals. The term "chelating agent" as used herein indicates chelating compound mainly included to chelate calcium and magnesium ions in the ink to reduce the hardness of the ink; pH modifier is to adjust the pH of the ink to ensure that the pH of the ink is within the range required by the nozzle. The antibacterial agent is typically included to ensure that the ink will not be blocked due to bacteria contamination; the leveling agent is a chemical that improves the spreading performance of the ink on the printing medium.

In embodiments in which reactive ink prefabricated liquid comprising polyhydric alcohol is used, the polyhydric alcohol includes at least one of ethylene glycol, glycerol, 1,2-hexanediol, and 1,5-pentanediol.

In embodiments, in which reactive ink prefabricated liquid is used preferably, a mass percentage of the polyhydric alcohol is 15%-30%; a mass percentage of the solubilizer, which is N-methyl-2-pyrrolidone, is 0.1%-5%; a mass percentage of the wetting agent, which is AEO-7, is 1%-5%; a mass percentage of the chelating agent, which is ethylenediamine tetraacetic acid disodium (EDTA), is 0.005%-0.2%; a mass percentage of the pH adjuster, which is triethanolamine, is 0.005%-1%; a mass percentage of the antibacterial agent, which is Proxel GXL, is 0.01%-1%; and a mass percentage of the leveling agent, which is ST-1075, is 0.01%-1%.

In some more preferred embodiments of the reactive digital printing method of the disclosure and related system, printed fabric and fabric items, a mass percentage of the dye with multi-reactive groups in the ink is 5%-25%.

In some preferred embodiments of the reactive digital printing method of the disclosure and related systems printed fabric and fabric items, colors of the dye with multi-reactive groups comprise brilliant blue, magenta, yellow, black, orange, bright red, navy blue, gray, and purple; wherein, brilliant blue, magenta, yellow, and black are basic colors.

In some preferred embodiments of the reactive digital printing method of the disclosure and related systems, printed fabric and fabric items, the primer comprises an alkaline agent, a thickener, an antioxidant, and water.

In some more preferred embodiments of the reactive digital printing method of the disclosure and related systems, printed fabric and fabric items, a mass percentage of the alkaline agent is 0.1%-2%.

In some more preferred embodiments of the reactive digital printing method of the disclosure and related systems, printed fabric and fabric items, a mass percentage of the thickener is 0.5%-5%.%. In some more preferred embodiments of the reactive digital printing method of the disclosure and related systems, printed fabric and fabric items, a mass percentage of the antioxidant is 0.5%-2%.%.

In some more preferred embodiments of the reactive digital printing method of the disclosure and related systems, printed fabric and fabric items, the alkaline agent is selected from the group consisting of sodium bicarbonate, sodium carbonate, sodium hydroxide, sodium silicate, trisodium phosphate, and sodium hexametaphosphate.

In some more preferred embodiments of the reactive digital printing method of the disclosure and related systems, printed fabric and fabric items, the thickener is selected from the group consisting of sodium alginate, modified starch, and modified cellulose.

In some more preferred embodiments of the reactive digital printing method of the disclosure and related systems fabric and clothing items, the modified cellulose is selected from the group consisting of carboxymethyl cellulose, hydroxyethyl cellulose, hydroxypropyl cellulose, and ethyl cellulose.

In some more preferred embodiments of the reactive digital printing method of the disclosure and related systems, printed fabric and fabric items, the anti-reducing agent is a resist salt.

In some preferred embodiments of the reactive digital printing method of the disclosure and related systems fabric and clothing items, the fabric to be printed is selected from the group consisting of a cellulose fiber fabric, a regenerated cellulose fiber fabric, a blended fabric and an interwoven fabric.

In some more preferred embodiments of the reactive digital printing method of the disclosure and related systems, printed fabric and fabric items, the regenerated cellulose fiber is a fiber with natural cellulose (cotton, linen, bamboo, tree, and shrub) as a raw material, without changing its chemical structure, where only change of the physical structure of the natural cellulose produces a regenerated cellulose fiber with better performance.

In some preferred embodiments of the reactive digital printing method of the disclosure and related systems, printed fabric and fabric items, the semi-finished fabric to be printed includes a cotton fiber semi-product, a viscose fiber semi-product, a linen fiber semi-product, and a silk fiber semi-product.

In some preferred embodiments of the reactive digital printing method of the disclosure and related systems, printed fabric and fabric items, a temperature of the steaming and coloring can be 60-120° C., preferably 80~110° C.

In some preferred embodiments of the reactive digital printing method of the disclosure and related systems, printed fabric and fabric items, a steam pressure of the steaming and coloring is 0.2~0.5 Mpa.

In some preferred embodiments of the reactive digital printing method of the disclosure and related systems, printed fabric and fabric items, a duration of the steaming and coloring is 3~15 mins.

In the process of the steaming and coloring, the dye with multi-reactive groups is covalently cross-linked with hydroxyl groups on the fiber of the semi-finished fabric.

In some preferred embodiments of the reactive digital printing method of the disclosure and related systems, printed fabric and fabric items, the water washing process washes off the primer and unreacted or hydrolyzed dyes on a cloth surface.

In some more preferred embodiments of the reactive digital printing method of the disclosure and related systems, printed fabric and fabric items, the water washing process is divided into three steps, where the first step is washing at normal temperature (25~40° C.), without washing additives, with a washing time of 5-15 minutes; the second step is washing with hot water, where a temperature of the hot water is 60-80° C., the non-ionic soaping agent DM-1544 is added, with an addition amount of 0.5-2 g/L, with a washing time of 5-15 minutes; the third step is washing at normal temperature (25~40° C.), with a washing time of 5-10 minutes.

In some more preferred embodiments of the reactive digital printing method of the disclosure and related systems, printed fabric and fabric items, in the process of water washing, a bath ratio is 1:10.

In some preferred embodiments of the reactive digital printing method of the disclosure and related systems, printed fabric and fabric items, the method of the dehydrating is performed by dehydrating the washed fabric in a centrifugal dehydrator, and the dehydrating time is 1 to 4 mins.

In some preferred embodiments of the reactive digital printing method of the disclosure and related systems, printed fabric and fabric items, the method of shaping includes pad-batching the dehydrated fabric with polyethylene wax soft oil with a mass concentration of 1-3%, and then shaping and drying in a stenter.

In some more preferred embodiments of the reactive digital printing method of the disclosure and related systems, printed fabric and fabric items, the temperature of the drying is 140-160° C.

In some more preferred embodiments of the reactive digital printing method of the disclosure and related systems, printed fabric and fabric items, the duration of the drying is 80-100 seconds.

A further aspect of the present disclosure provides a printed fabric prepared by the method according to the first aspect of the present disclosure.

The term "fabric" or "textile" as used herein refers various fiber-based materials, including fibers, yarns, filaments, threads, different fabric types, and additional fiber-based material identifiable by an ordinary skilled person in the art. Fabrics in the sense of the disclosure comprise consumer textiles such as clothing, where the primary purpose of the fabric is comfort and/or style. Fabrics in the sense of the disclosure also comprise technical textiles such as geotextile, industrial textile, medical textiles where functionality is the primary purpose of the fabric. Exemplary fabrics comprise woven fabrics, knitted fabrics, non-woven fabrics and additional fabrics identifiable by an ordinary skilled person in the art. Fabrics in the sense of the disclosure comprise natural fabric and synthetic fibers or mixtures thereof [5]

In some embodiments of the reactive digital printing method of the disclosure and related systems, printed fabric and fabric items, the pH of the printed fabric is 6~7.

Methods of the present disclosure can be performed by combinations of at least one a primer with at least one of, an ink, a reactive dye, a fabric, means for steaming means for coloring, means for washing, means for dehydrating and/or means for shaping the fabric, as will be understood by a skilled person.

In particular, a system for reactive digital printing comprises a combination of at least one primer herein described herewith in combination with one of one or more inks, one of one or more reactive dyes. In the thermal transfer system of the present disclosure the components of the system are comprised in combination, for use in performing reactive digital printing in accordance with anyone of the methods of the disclosure, as will be understood by a skilled person.

In a further aspect of the disclosure, a printed fabric is described which is obtained with any one of the method and/or system for reactive digital printing of the present disclosure.

In an additional aspect, a fabric item of the present disclosure comprises a blended fabric obtained with the method and/or system of the disclosure. The wording "fabric item" in the sense of the disclosure indicates an object that comprises fabric, such as drapes, towels, tablecloth, kitchen cloth, blankets and garments for humans or pets as well as further objects comprising fabric identifiable by a skilled person.

Figure 4A:
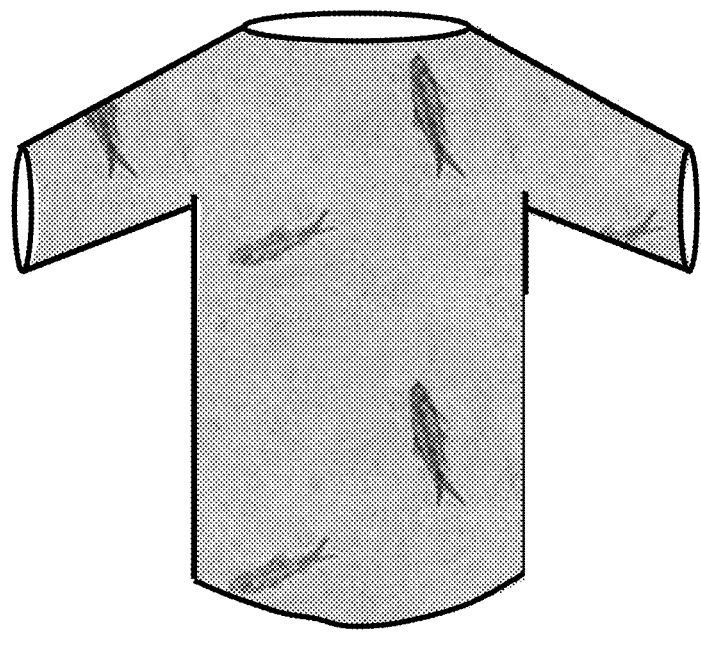
FIGS. 4A and 4B show schematic representations of exemplary articles of clothing with blended fabric prepared with a method and/or system of the disclosure.
Figure 4B:
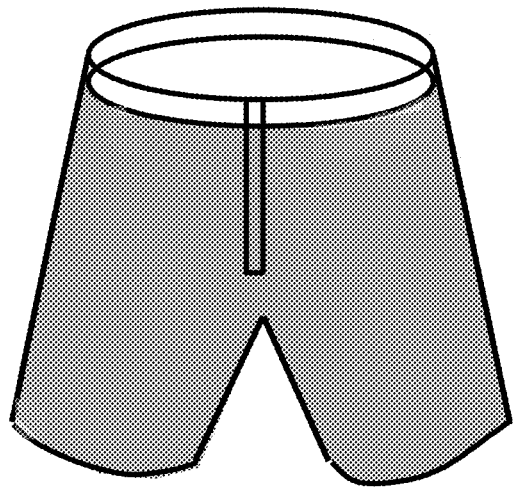

In particular, in preferred embodiments the fabric item can be a clothing item such as the exemplary garments schematically illustrated in FIGS. 4A and 4B. FIG. 4A shows a shirt with a thermal transferred decorative pattern and FIG. 4B shows shorts with a thermal transferred repeating pattern design.

The beneficial effects of the present reactive digital printing method of the disclosure and related systems, printed fabric and fabric items include:

(1) The present reactive digital printing method of the disclosure and related systems fabric and clothing items uses dyes with reactive groups as colorants in digital printing, prints the fabric with the low-alkali primer, and completes the entire digital printing process after drying, steaming and coloring, simple washing, dehydrating, and shaping; the preparation process is clean and environmentally friendly, and the obtained printed fabric has the characteristics of good fastness, high color fixation rate, good hand feeling and bright color.

(2) The present reactive digital printing method of the disclosure and related systems fabric and clothing items utilizes the characteristics of high reactivity of the dye with multi-reactive groups, which does not require a high pH environment and has low requirement for humidity during the steaming and coloring. In the reactive digital printing method of the disclosure, the reactive digital printing is implemented on the fabric treated with the low-alkali primer, which can achieve a higher color fixation rate after the steaming and coloring, and the pH value of the obtained printed fabric is close to neutral.

(3) The water washing treatment in the present reactive digital printing method of the disclosure is simple in operation and does not need soaping at a high temperature. Especially, the primer in the present disclosure does not use urea, which reduces the alkali content and ammonia nitrogen content of the washing water residue, and thus it has obvious advantages in water consumption, energy consumption and ammonia nitrogen emission, which is conducive to energy saving and consumption reduction and clean production of reactive digital printing products.

DESCRIPTION OF EXEMPLARY EMBODIMENTS

The present reactive digital printing method of the disclosure and related systems fabric and fabric items will be further described below with reference to specific examples, and the advantages and characteristics of the reactive digital printing method of the disclosure and related systems fabric and items of present disclosure which are provided by way of illustration and are not intended to be limiting.

In particular, the following examples illustrate exemplary reactive digital printing methods of the disclosure and related systems, as well as resulting printed fabric. A person skilled in the art will appreciate the applicability and the necessary modifications to adapt the features described in detail in the present section, to additional methods, systems printed fabrics as well as related items and in particular clothing items according to embodiments of the present disclosure.

The test materials and reagents used in the following examples can be purchased commercially unless otherwise specified.

Example 1: Digital Direct Injection Mono-Color Printed Product

The digital direct injection mono-color printed product in Example 1 uses 100% a cotton twill woven fabric semi-finished product as a printing object, wherein, the fabric specification is 21S/1×21S/1, the fabric density is 72×40, and the gram weight is 240 g/m². Semi-finished product as used herein are fabric that are used as inventory inputs in the manufacture of finished goods, which are products ready for sale to consumers.

The primer in Example 1 is composed of sodium bicarbonate, 3-nitrobenzenesulfonic acid sodium salt, sodium alginate and water, wherein, the mass percentage of sodium bicarbonate is 1%, the mass percentage of 3-nitrobenzenesulfonic acid sodium salt is 1%, the mass percentage of sodium alginate is 2%, and the rest is water.

The printing process in Example 1 includes the following steps:

(1) Applying the primer: the primer is applied to the above fabric to be printed by pad-batching and dried, and then is subject to the treatment of one immersing and one pressing; wherein, the pick-up ratio is 70%, the temperature of drying is 120° C., and the time of drying is 3 mins.

(2) Preparation of a reactive dye ink: the reactive brilliant blue Avitera FT containing one monochloro-s-triazine reactive group and two vinylsulfone reactive groups in the molecule is mixed in the reactive ink prefabricated liquid, so as to prepare the reactive dye ink in Example 1. In this case, the mass percentage of the reactive brilliant blue Avitera FT in the ink is 10%, the reactive ink prefabricated liquid includes: 1,2-hexanediol in the mass percentage of 20%; the solubilizer, which is N-methyl-2-pyrrolidone, in the mass percentage of 1.5%; the wetting agent, which is AEO-7, in the mass percentage of 1%; the chelating agent, which is ethylenediamine tetraacetic acid disodium (EDTA), in the mass percentage of 0.05%; the pH adjuster, which is triethanolamine, in the mass percentage of 0.02%; the antibacterial agent, which is Proxel GXL, in the mass percentage of 0.1%; the leveling agent, which is ST-1075, in the mass percentage of 0.05%; remaining water.

A digital printer with a piezoelectric nozzle is utilized to print mono-color blocks on the dried fabric in the step (1), where the printed color is brilliant blue, and the volume of the printing ink is 100%. After printing, it is dried at a temperature of 80° C. for 2 minutes.

(3) Steaming and coloring: the color blocks obtained in the step (2) are steamed and colored using a continuous loop steamer, with a temperature of 102° C., with a steam pressure of 0.25 Mpa and a steaming time of 8 mins (minutes).

(4) Washing with water: the color blocks after steaming and coloring in the step (3) are washed in an overflow washing machine, where the washing steps and processes include: washing at 40° C. for 10 mins, washing at 80° C. for 10 mins, adding a non-ionic soaping agent before washing at 40° C. for 10 mins, and the bath ratio is 1:10.

(5) Dehydrating: the color blocks after washing in the step (4) are dehydrated in a centrifugal dehydrator, with a dehydrating time of 2 mins.

(6) Shaping: the dehydrated fabric is pad-batched with polyethylene wax soft oil with a mass concentration of 2%, and then is shaped and dried in a stenter; wherein, the temperature of the drying is 150° C., and the duration of the drying is 90 seconds.

The steps for printing magenta blocks are the same as for brilliant blue blocks, the only difference is that the reactive dye used is the reactive red Avitera BF with two monochloro-s-triazine and one vinylsulfone reactive group, wherein, the mass percentage of the reactive red Avitera BF in the ink is 10%.

The steps for printing yellow blocks are the same as for brilliant blue blocks, the only difference is that the reactive dye used is the reactive yellow Avitera TVS with one monofluoro-s-triazine and two vinylsulfone reactive groups, wherein, the mass percentage of the reactive yellow Avitera TVS in the ink is 8%.

The steps for printing black blocks are the same as for brilliant blue blocks, the only difference is that the reactive dye used is the reactive black PBVT with one monochloros-triazine and two vinylsulfone reactive groups, wherein, the mass percentage of the reactive black PBVT in the ink is 15%.

The steps for printing orange blocks are the same as for brilliant blue blocks, the only difference is that the reactive dye used is the reactive orange TOS-G with two monochloro-s-triazine and one vinylsulfone reactive group, wherein, the mass percentage of the reactive orange TOS-G in the ink is 10%.

The steps for printing navy blue blocks are the same as for brilliant blue blocks, the only difference is that the reactive dye used is the reactive navy blue Avitera BFG with three monochloro-s-triazine reactive groups, wherein, the mass percentage of the reactive navy blue Avitera BFG in the ink is 10%.

The steps for printing gray blocks are the same as for brilliant blue blocks, the only difference is that the reactive dye used is the reactive black PBVT with one monochloro-s-triazine and two vinylsulfone reactive groups, wherein, the mass percentage of the reactive black PBVT in the ink is 3%.

The steps for printing bright red blocks are the same as for brilliant blue blocks, the only difference is that the reactive dye used is the reactive bright red RCT-Y with two vinylsulfone reactive groups and one monofluoro-s-triazine, wherein, the mass percentage of the reactive bright red RCT-Y in the ink is 10%.

Example 2: First Comparative Example of Digital Direct Injection of a Mono-Color Printed Product The digital direct injection mono-color printed product in this first Comparative Example uses 100% a cotton twill woven fabric semi-finished product as a printing object, wherein, the fabric specification is 21S/1×21S/1, the density is 72×40, and the gram weight is 240 g/m².

The primer in this first Comparative Example is composed of sodium bicarbonate, 3-nitrobenzenesulfonic acid sodium salt, sodium alginate, urea and water, wherein, the mass percentage of sodium bicarbonate is 3%, the mass percentage of 3-nitrobenzenesulfonic acid sodium salt is 1%, the mass percentage of sodium alginate is 2%, the mass percentage of urea is 10%, and the rest is water. The primer in Comparative Example 1 represents the primer with higher alkali content in the prior art.

The printing steps in this first Comparative Example are the same as those in Example 1, the only difference is that the ink used in this first Comparative Example is a commercially available conventional monochloro-s-triazine reactive dye ink, which is purchased from Zhuhai Tianwei New Materials Co., Ltd., and the type is reactive digital inkjet ink HF. Comparative Example 1 represents the digital direct injection mono-color printed product in the prior art.

The tests of the printed fabrics in Example 1 and this first Comparative Example include:

(1) Color depth test: a computerized color test instrument is used to test the K/S value of the apparent color depth of the mono-color block, where the test result is the absorption value at the maximum absorption wavelength. The higher the absorption value is, the deeper the color is.

(2) Color fastness test: the color fastness includes washing fastness and color fastness to rubbing; the washing fastness is tested by the test method in ISO 105 C06, in order to test the discoloration of the printed fabric and the staining of the white accompanied washing articles during the washing process; the color fastness to rubbing is tested by the test method in ISO 105×12, and is classified into color fastness to dry rubbing and color fastness to wet rubbing, which is used to characterize the rubbing resistance of the color of the printed fabric.

(3) Color fixation rate test: firstly, color blocks with fixed area are printed on a plastic wrap, and all of them are washed with water and collected, and they are diluted to a certain volume, and the absorbance A1 thereof is tested and obtained; color blocks with the same size are printed on the cotton cloth after the primer treatment, and the printing is implemented according to the steps in Example 1; and, the residual liquid after washing with water in the step (4) is collected and diluted to the same volume, and the absorbance A2 thereof is tested and obtained. The color fixation rate F is calculated according to the following formula:

$$F = \frac{(A_1 - A_2)}{A_1} \times 100\%$$

TABLE 1

Table 1: The color depth K/S value, color fastness and color fixation rate of the color blocks of Example 1 and this first Comparative Example (indicated in Table 1 as Comparative Example 1).

| | | | Color fastness to washing | | Color fastness to rubbing | | |
| --- | --- | --- | --- | --- | --- | --- | --- |
| | | K/S value | Color fastness to changing | Color fastness to staining | Color fastness to dry rubbing | Color fastness to wet rubbing | Color fixation rate % |
| Brilliant blue | Example 1 | 677 nm 27.35 | 4-5 | 4 | 4-5 | 3 | 63.2 |
| | Comparative Example 1 | 672 nm 23.76 | 4-5 | 4 | 4-5 | 2-3 | 47.4 |
| Magenta | Example 1 | 533 nm 29.03 | 4-5 | 4-5 | 4 | 3 | 75.1 |
| | Comparative Example 1 | 530 nm 25.42 | 4-5 | 4-5 | 3 | 3 | 72.9 |
| Yellow | Example 1 | 427 nm 24.37 | 4-5 | 4-5 | 4 | 3-4 | 72.7 |
| | Comparative Example 1 | 430 nm 19.85 | 4-5 | 4-5 | 3 | 3 | 65.3 |
| Black | Example 1 | 605 nm 30.12 | 4-5 | 4-5 | 4-5 | 3 | 76.6 |

TABLE 1-continued

Table 1: The color depth K/S value, color fastness and color fixation
rate of the color blocks of Example 1 and this first Comparative
Example (indicated in Table 1 as Comparative Example 1).

| | | | Color fastness to washing | | Color fastness to rubbing | | |
| | | K/S value | Color fastness to changing | Color fastness to staining | Color fastness to dry rubbing | Color fastness to wet rubbing | Color fixation rate % |
| --- | --- | --- | --- | --- | --- | --- | --- |
| | Comparative Example 1 | 601 nm 25.13 | 4-5 | 4-5 | 4-5 | 2-3 | 68.3 |
| Orange | Example 1 | 489 nm 28.89 | 4-5 | 4-5 | 4-5 | 3 | 79.6 |
| | Comparative Example 1 | 492 nm 26.35 | 4-5 | 4-5 | 4-5 | 3 | 71.9 |
| Navy blue | Example 1 | 624 nm 17.76 | 4-5 | 4-5 | 4-5 | 3-4 | 79.3 |
| | Comparative Example 1 | 632 nm 13.70 | 4-5 | 4-5 | 4-5 | 3 | 67.4 |
| Gray | Example 1 | 604 nm 4.22 | 4-5 | 4-5 | 4-5 | 4 | 75.3 |
| | Comparative Example 1 | 590 nm 3.01 | 4-5 | 4-5 | 4-5 | 4 | 66.5 |
| Bright red | Example 1 | 517 nm 29.44 | 4-5 | 4-5 | 4-5 | 3 | 75.3 |
| | Comparative Example 1 | 520 nm 25.73 | 4-5 | 4-5 | 4 | 3 | 71.2 |

The test results of the color depth K/S value, color fastness and color fixation rate of the color blocks of Example 1 and this Comparative Example are shown in Table 1. As can be seen from Table 1, in the process of the digital direct injection mono-color printed product, there is no need to add urea to the primer in Example 1 of the present disclosure, so that the use of alkali in the primer can be reduced. Additionally, the K/S values of 8 color blocks, which are brilliant blue, magenta, yellow, black, orange, navy blue, grey and bright red, in the printed product obtained in Example 1 are all higher than those in the Comparative Example, indicating that the color blocks in Example 1 of the present disclosure are deeper in color. Furthermore, in terms of color fixation rate, the color fixation rate of the printed product in Example 1 of the present disclosure is also higher than that in the Comparative Example, and the color blocks of magenta, yellow, black, blue and bright red in Example 1 of the present disclosure also have certain advantages in color fastness to rubbing.

Example 3: Digital Reactive Cold Transfer Mono-Color Printed Product

The digital reactive cold transfer mono-color printed product in this Example uses 100% a cotton twill woven fabric semi-finished product as a printing object, wherein, the fabric specification is 21S/1×21S/1, the density is 72×40, and the gram weight is 240 g/m².

The primer in this Example is composed of sodium bicarbonate, 3-nitrobenzenesulfonic acid sodium salt, sodium alginate and water, wherein, the mass percentage of sodium bicarbonate is 0.5%, the mass percentage of 3-nitrobenzenesulfonic acid sodium salt is 1%, the mass percentage of sodium alginate is 1.5%, and the rest is water.

The steps for digital reactive cold transfer mono-color printed product in this Example include:

(1) Applying the primer: the primer is applied to the above fabric to be printed by pad-batching and dried, and then is subject to the treatment of one immersing and one pressing; wherein, the pick-up ratio is 70%, the temperature of drying is 120° C., and the time of drying is 3 mins.

(2) Preparation of a reactive dye ink: the reactive brilliant blue Avitera FT containing one monochloro-s-triazine reactive group and two vinylsulfone reactive groups in the molecule is mixed in the reactive ink prefabricated liquid, so as to prepare the ink in Example 2. The reactive ink prefabricated liquid in Example 2 is the same as that in Example 1, wherein, the mass percentage of the reactive brilliant blue Avitera FT is 10%, the volume of the printing ink is 100%. A digital printer is used to print the above ink on a cold transfer printing film, and after printing, it is dried and rolled at a temperature of 80° C., the time of drying is 2 minutes, so as to obtain a brilliant blue color block.

(3) The fabric after applying the primer in the step (1) and the cold transfer printing film in the step (2) are attached, and then it is placed in a transfer printing unit of the digital printer, and the printed fabric is dried after pressing and transfer printing, with a pressure of 0.4 Mpa, with a transfer speed of 6 m/min, with a drying temperature of 100° C. and a drying time of 3 mins.

(4) Steaming and coloring: the fabric obtained in the step (3) is steamed and colored using a continuous loop steamer, with a temperature of 102° C., with a steam pressure of 0.25 Mpa and a steaming time of 8 mins.

(5) Washing with water: the fabric after steaming and coloring in the step (4) is washed in an overflow washing machine, where the washing steps and processes include: washing at 40° C. for 10 mins, washing at 80° C. for 10 mins, adding a non-ionic soaping agent DM-1544 (the amount is 1 g/L) before washing at 40° C. for 10 mins, and the bath ratio is 1:10.

(5) Dehydrating: the fabric after washing in the step (5) is dehydrated in a centrifugal dehydrator, with a dehydrating time of 2 mins.

(7) Shaping: the dehydrated fabric is pad-batched with polyethylene wax soft oil with a mass concentration of 2%, and then is shaped and dried in a stenter; wherein, the temperature of the drying is 150° C., and the duration of the drying is 90 seconds.

The steps for printing magenta blocks are the same as for brilliant blue blocks, the only difference is that the reactive dye used is the reactive red Avitera BF with two mono-chloro-s-triazine and one vinylsulfone reactive group, wherein, the mass percentage of the reactive red Avitera BF in the ink is 10%.

The steps for printing yellow blocks are the same as for brilliant blue blocks, the only difference is that the reactive dye used is the reactive yellow Avitera TVS with one monofluoro-s-triazine and two vinylsulfone reactive groups, wherein, the mass percentage of the reactive yellow Avitera TVS in the ink is 8%.

The steps for printing black blocks are the same as for brilliant blue blocks, the only difference is that the reactive dye used is the reactive black PBVT with one monochloro-s-triazine and two vinylsulfone reactive groups, wherein, the mass percentage of the reactive black PBVT in the ink is 15%.

The steps for printing orange blocks are the same as for brilliant blue blocks, the only difference is that the reactive dye used is the reactive orange TOS-G with two mono-chloro-s-triazine and one vinylsulfone reactive group, wherein, the mass percentage of the reactive orange TOS-G in the ink is 10%.

The steps for printing navy blue blocks are the same as for brilliant blue blocks, the only difference is that the reactive dye used is the reactive navy blue Avitera BFG with three monochloro-s-triazine reactive groups, wherein, the mass percentage of the reactive navy blue Avitera BFG in the ink is 10%.

The steps for printing gray blocks are the same as for brilliant blue blocks, the only difference is that the reactive dye used is the reactive black PBVT with one monochloro-s-triazine and two vinylsulfone reactive groups, wherein, the mass percentage of the reactive black PBVT in the ink is 3%.

The steps for printing bright red blocks are the same as for brilliant blue blocks, the only difference is that the reactive dye used is the reactive bright red RCT-Y with two vinylsulfone reactive groups and one monofluoro-s-triazine, wherein, the mass percentage of the reactive bright red RCT-Y in the ink is 10%.

Example 4: Second Comparative Example of Digital Reactive Cold Transfer Mono-Color Printed Product The digital reactive cold transfer mono-color printed product in this second Comparative Example uses 100% a cotton twill woven fabric semi-finished product as a printing object, wherein, the fabric specification is 21S/1×21S/1, the density is 72×40, and the gram weight is 240 g/m$^2$.

The primer in this second Comparative Example is composed of sodium bicarbonate, 3-nitrobenzenesulfonic acid sodium salt, sodium alginate, urea and water, wherein, the mass percentage of sodium bicarbonate is 3%, the mass percentage of 3-nitrobenzenesulfonic acid sodium salt is 1%, the mass percentage of sodium alginate is 1.5%, the mass percentage of urea is 10%, and the rest is water.

The printing steps in this second Comparative Example are the same as those in Example 3, the only difference is that the ink used in this second Comparative Example is a commercially available conventional monochloro-s-triazine reactive dye ink, which is purchased from Zhuhai Tianwei New Materials Co., Ltd., and the type is reactive digital inkjet ink HF. The primer in this second Comparative Example represents the primer with higher alkali content in the prior art.

The test results of the color depth K/S value, color fastness and color fixation rate of the color blocks of Example 3 and this second Comparative Example are shown in Table 2.

TABLE 2

Table 2: The color depth K/S value, color fastness and color fixation rate of the color blocks of Example 3 and this second Comparative Example indicated in Table 2 as Comparative Example 2.

| | | | Color fastness to washing | | Color fastness to rubbing | | |
| --- | --- | --- | --- | --- | --- | --- | --- |
| | | K/S value | Color fastness to changing | Color fastness to staining | Color fastness to dry rubbing | Color fastness to wet rubbing | Color fixation rate % |
| Brilliant blue | Example 2 | 677 nm 25.53 | 4-5 | 4 | 4-5 | 3-4 | 75.2 |
| | Comparative Example 2 | 671 nm 22.79 | 4-5 | 4 | 4-5 | 3 | 65.4 |
| Magenta | Example 2 | 533 nm 27.66 | 4-5 | 4-5 | 4-5 | 3 | 83.7 |
| | Comparative Example 2 | 530 nm 24.45 | 4-5 | 4-5 | 3-4 | 3 | 74.9 |
| Yellow | Example 2 | 427 nm 25.06 | 4-5 | 4-5 | 4-5 | 3-4 | 81.7 |
| | Comparative Example 2 | 430 nm 19.78 | 4-5 | 4-5 | 4 | 3-4 | 74.3 |
| Black | Example 2 | 605 nm 27.75 | 4-5 | 4-5 | 4-5 | 3 | 80.6 |
| | Comparative Example 2 | 601 nm 25.58 | 4-5 | 4-5 | 4-5 | 2-3 | 75.3 |
| Orange | Example 2 | 489 nm 29.03 | 4-5 | 4-5 | 4-5 | 3 | 83.4 |
| | Comparative Example 2 | 492 nm 27.74 | 4-5 | 4-5 | 4-5 | 3 | 77.5 |
| Navy blue | Example 2 | 624 nm 18.32 | 4-5 | 4-5 | 4-5 | 3-4 | 81.3 |

TABLE 2-continued

Table 2: The color depth K/S value, color fastness and color fixation
rate of the color blocks of Example 3 and this second Comparative
Example indicated in Table 2 as Comparative Example 2.

| | | | Color fastness to washing | | Color fastness to rubbing | | |
| | | K/S value | Color fastness to changing | Color fastness to staining | Color fastness to dry rubbing | Color fastness to wet rubbing | Color fixation rate % |
|---|---|---|---|---|---|---|---|
| | Comparative Example 2 | 632 nm 13.87 | 4-5 | 4-5 | 4-5 | 3-4 | 73.4 |
| Gray | Example 2 | 604 nm 4.16 | 4-5 | 4-5 | 4-5 | 4 | 80.5 |
| | Comparative Example 2 | 590 nm 3.56 | 4-5 | 4-5 | 4-5 | 4 | 73.3 |
| Bright red | Example 2 | 517 nm 28.27 | 4-5 | 4-5 | 4-5 | 3-4 | 82.5 |
| | Comparative Example 2 | 520 nm 25.03 | 4-5 | 4-5 | 4 | 3-4 | 77.9 |

The test results of the color depth K/S value, color fastness and color fixation rate of the color blocks of Example 3 and this second Comparative Example are shown in Table 2. As can be seen from Table 2, in the process of the digital reactive cold transfer mono-color printed product, there is no need to add urea to the primer in Example 2 of the present disclosure, so that the use of alkali in the primer can be reduced. Additionally, the K/S values of 8 obtained color blocks, which are brilliant blue, magenta, yellow, black, orange, navy blue, grey and bright red, in the printed product obtained in Example 3 are all higher than those in this second Comparative Example, indicating that the color blocks in Example 3 of the present disclosure are deeper in color. Furthermore, in terms of color fixation rate, the color fixation rate of the printed product in Example 3 of the present disclosure is also higher than that in this second Comparative Example, and the color blocks of brilliant blue, magenta, yellow, black and bright red in Example 3 of the present disclosure also have certain advantages in color fastness.

Example 5: Digital Reactive Cold Transfer Mono-Color Printed Product Made of Cotton Knitted Fabric The digital reactive cold transfer printed product in this Example uses 40S cotton+20D spandex knitted plain weave semi-finished fabric as a printing object, wherein, it contains 95% cotton+5% spandex, the gram weight is 170 g/m², and the width is 160 cm.

The steps for the digital reactive cold transfer printed product in this Example are the same as those in Example 3, the only difference is that the printing object is different, where the printing object in this Example is 40S cotton+20D spandex knitted plain weave semi-finished fabric. The finished product of digital cold transfer printing in this Example is shown in FIG. 1. As can be seen from FIG. 1, the printed finished fabric prepared in this Example of the present disclosure has high color saturation, and the printed finished fabric has a good hand feeling. The digital reactive cold transfer printed product in the embodiment of the present disclosure also reduces the content of the alkaline agent in the primer of the treated fabric under the premise of ensuring the quality of the prepared printed fabric, thereby solving the problem of the high content of urea and alkaline agent in the primer in the reactive digital printing process in the prior art, and avoiding the use of complicated steps in the washing process.

Example 6: Digital Reactive Cold Transfer Mono-Color Printed Product Made of Cotton Woven Fabric The digital reactive cold transfer printed product in this Example uses 100% cotton woven plain weave semi-finished fabric as a printing object, wherein, the fabric specification is 40S/1×40S/1, the density is 110×70/cm, the gram weight is 105 g/m², and the width is 150 cm.

Figure 2:
FIG. 2 shows a physical diagram of a printed product in Example 5.

The steps for the digital reactive cold transfer printed product in this Example are the same as those in Example 3, the only difference is that the printing object is different, where the printing object in this Example is 100% cotton woven plain weave semi-finished fabric. The finished product of digital cold transfer printing in this Example is shown in FIG. 2. As can be seen from FIG. 2, the overall printing effect of the fabric in FIG. 2 is better, which not only meets the customer's requirements but also avoids the use of urea in the primer, thereby reducing the discharge of ammonia nitrogen in wastewater, and further reducing the burden of water washing.

Example 7: Digital Direct Injection Mono-Color Printed Product Made of Rayon Woven Fabric The digital direct injection mono-color printed product in Example 7 uses 100% rayon plain weave woven fabric semi-finished product as a printing object, wherein, the fabric specification is 45S/1×45 S/1, the density is 110×72, the gram weight is 110 g/m², and the width is 142 cm.

Figure 3:
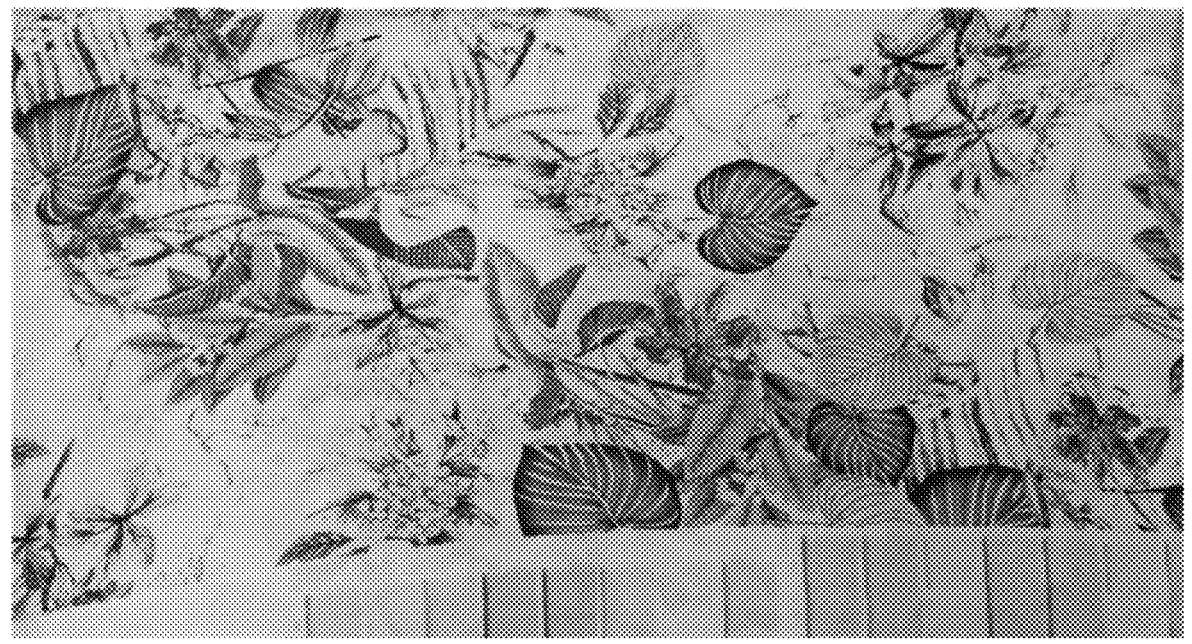
FIG. 3 shows a physical diagram of a printed product in Example 7.

The steps for the digital direct injection mono-color printed product in this Example are the same as those in Example 1, the only difference is that the printing object is different, where the printing object in this Example 7 is 100% rayon plain weave woven fabric semi-finished product. The finished product of digital direct injection mono-color printing in this Example is shown in FIG. 3. As can be seen from FIG. 3, the printed fabric obtained in this Example is bright in color, with soft hand feeling, which also avoids the use of urea in the primer, reduces the content of alkaline agent in the primer, and is beneficial to reducing processing costs, reducing the burden of wastewater treatment and reducing the impact on the environment.

The color fastness to washing and the color fastness to rubbing of the printed fabrics in Examples 5-7 are tested. The pH value of the fabric is also tested, and the pH value is measured in accordance with the method specified in ISO 3071, wherein the pH value of wearing textiles used is generally required to be 4.0-8.5. The color fastness to washing, the color fastness to rubbing and pH value of cloth surface of the printed fabrics in Examples 5-7 are shown in Table 3.

TABLE 3

Color fastness to washing, color fastness to rubbing and pH value of cloth surface of the printed fabrics in Examples 5-7.
Table 3

| | Color fastness to washing | | Color fastness to rubbing | | pH value |
| | Color fastness to changing | Color fastness to staining | Color fastness to dry rubbing | Color fastness to wet rubbing | of cloth surface |
|---|---|---|---|---|---|
| Example 5 | 4-5 | 4-5 | 4-5 | 3 | 6.6 |
| Example 6 | 4-5 | 4-5 | 4-5 | 4 | 6.8 |
| Example 7 | 4-5 | 4-5 | 4-5 | 4 | 6.3 |

As can be seen from Table 3, the reactive digital printing fabrics obtained in the examples of the present disclosure have excellent color fastness to washing and color fastness to rubbing, and the pH value of the fabric is close to neutral, which reduces the number of washings, where only 3 washings are required, and the pH and the color fastness of the fabric can meet the requirements in the market. Furthermore, in the preparation process of the fabric in the examples of the present disclosure, no urea is added to the primer, and the content of the alkaline agent is low, which facilitates to reduce the ammonia nitrogen content in the wastewater discharged during the fabric printing process, and is beneficial to saving the treatment costs.

In summary, a combination of primer, a dye with multi-reactive groups and a related reactive digital printing method are described as well as related printed fabric and items comprising the printed fabric, in particular clothing items. The method comprises the following steps: 1) applying a primer to a fabric to be printed; (2) applying an ink containing a dye with multi-reactive groups to the fabric to be printed in step (1); (3) steaming and coloring, washing, dehydrating and shaping the fabric in step (2), to obtain a printed product. In methods and systems of the disclosure dyes with reactive groups are used as colorants in digital printing, prints the fabric with the primer, and completes the entire digital printing process after drying, steaming and coloring, simple washing, dehydrating, and shaping; the preparation process is clean and environmentally friendly, and the obtained printed fabric has the characteristics of good fastness, high color fixation rate, good hand feeling and bright color.

The above embodiments are preferred embodiments of the present disclosure, but the forms of realization of the present disclosure are not limited by the above embodiments. Any other changes, modifications, substitutions, combinations, and simplifications that do not deviate from the spirit and principle of the present disclosure should be regarded as equivalent alternatives and are included in the protection scope of the present disclosure.

Accordingly, the examples set forth above are provided to give those of ordinary skill in the art a complete disclosure and description of how to make and use the embodiments of the reactive digital printing method of the disclosure, and related materials, compositions, and systems, and are not intended to limit the scope of what the inventors regard as their disclosure. Modifications of the above-described modes for carrying out the disclosure that are obvious to persons of skill in the art are intended to be within the scope of the following claims. All patents and publications mentioned in the specification are indicative of the levels of skill of those skilled in the art to which the disclosure pertains.

The entire disclosure of each document cited (including patents, patent applications, journal articles, abstracts, laboratory manuals, books, or other disclosures) in the Background, Summary, Detailed Description, and Examples is hereby incorporated herein by reference. All references cited in this disclosure are incorporated by reference to the same extent as if each reference had been incorporated by reference in its entirety individually.

It is to be understood that the disclosures are not limited to particular compositions materials, or biological systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

Unless otherwise indicated, the disclosure is not limited to specific reactants, substituents, catalysts, reaction conditions, or the like, as such may vary. It is also to be understood that the terminology used herein is for the purpose of describing particular embodiments only and is not intended to be limiting.

As used in the specification and the appended claims, the singular forms "a", "an," and "the" include plural referents unless the context clearly dictates otherwise. Thus, for example, reference to "a polymer" includes a single polymer as well as a combination or mixture of two or more polymers, reference to "a substituent" encompasses a single substituent as well as two or more substituents, and the like.

As used in the specification and the appended claims, the terms "for example," "for instance," "such as," or "including" are meant to introduce examples that further clarify more general subject matter. Unless otherwise specified, these examples are provided only as an aid for understanding the applications illustrated in the present disclosure, and are not meant to be limiting in any fashion.

Although any methods and materials similar or equivalent to those described herein can be used in the practice for testing of the specific examples, additional appropriate materials and methods are described herein.

A number of embodiments of the disclosure have been described. Nevertheless, it will be understood that various modifications may be made without departing from the spirit and scope of the present disclosure. Accordingly, other embodiments are within the scope of the following claims.

REFERENCES

ADDIN EN.REFLIST 1. Wikipedia-ink. *Ink.* 2022; Available from: /en.wikipedia.org/wiki/Ink.
2. Wikipedia-pigment. *Pigment.* 2022; Available from: /en.wikipedia.org/wiki/Pigment.
3. Wikipedia-dye. *Dye.* 2022; Available from: /en.wikipedia.org/wiki/Dye.
4. Wikipedia-reactive-dye. *Reactive dye.* 2022; Available from: /en.wikipedia.org/wiki/Reactive_dye.
5. Wikipedia-textile. *Textile.* 2022; Available from: /en.wikipedia.org/wiki/Textile.

The invention claimed is:

1. A reactive digital printing method, comprising
applying a primer to a fabric to be printed, the applying performed before contacting the fabric with a dye with multi-reactive groups comprising three or more reactive groups the method comprising
(1) applying a primer to a fabric to be printed;
(2) applying an ink containing a dye with multi-reactive groups to the fabric to be printed in step (1) and
(3) steaming and coloring, washing, dehydrating and shaping the fabric in the step (2), so as to obtain a printed product; wherein the dye with multi-reactive groups comprises three or more reactive groups
wherein the step of washing comprises:
washing with water ranging from 25 to 40° C. for 5 to 15 mins;
soaping at a temperature ranging from 60 to 80° C. for 5 to 15 mins; and
washing with water at a temperature ranging from 5 to 40° C. for 5 to 15 mins.

2. The reactive digital printing method according to claim 1, wherein the dye with multi-reactive groups is selected from the group consisting of a divinylsulfone reactive group-monochloro-s-triazine reactive dye, a bis-mono-chloro-s-triazine reactive group-vinylsulfone reactive dye, a monofluoro-s-triazine reactive group-divinylsulfone reactive dye, a bis-monofluoro-s-triazine reactive group-vinylsulfone reactive dye, a divinylsulfone bis-monochloro-s-triazine reactive dye, and a reactive dye with three or more reactive groups.

3. The reactive digital printing method according to claim 1 wherein a mass percentage of the dye with multi-reactive groups in the ink ranges from 5% to 25%.

4. The reactive digital printing method according to claim 2, wherein colors of the dye with multi-reactive groups comprise brilliant blue, magenta, yellow, black, orange, bright red, navy blue, gray, and purple.

5. The reactive digital printing method according to claim 1, wherein the primer comprises an alkaline agent, a thickener, an antioxidant, and water.

6. The reactive digital printing method according to claim 5, wherein, a mass percentage of the alkaline agent ranges from 0.1% to 2%, a mass percentage of the thickener ranges from 0.5% to 5%, and a mass percentage of the antioxidant ranges from 0.5% to 2%.

7. The reactive digital printing method according to claim 5, wherein the alkaline agent is selected from the group consisting of sodium bicarbonate, sodium carbonate, sodium hydroxide, sodium silicate, trisodium phosphate, and sodium hexametaphosphate; the thickener is selected from the group consisting of sodium alginate, modified starch, and modified cellulose; the anti-reducing agent is a resist salt.

8. The reactive digital printing method according to claim 1, wherein the fabric to be printed is selected from the group consisting of a cellulose fiber fabric, a regenerated cellulose fiber fabric, a blended fabric and an interwoven fabric.

9. The method according to claim 1, wherein a temperature of the steaming and coloring ranges from 80 to 110° C., a steam pressure of the steaming and coloring ranges from 0.2 to 0.5 Mpa, a duration of the steaming and coloring ranges from 3 to 15 mins.

10. A printed fabric prepared by the method according to claim 1.

11. A system for reactive digital printing comprising a combination of a primer with at least one of a reactive dye, a fabric, means for steaming, means for coloring, means for washing, means for dehydrating and/or means for shaping the fabric according to the method of claim 1.

12. A fabric item comprising the printed fabric according to claim 10.

* * * * *